United States Patent [19]
Takamatsu

[11] 3,993,724
[45] Nov. 23, 1976

[54] APPARATUS FOR THE MANUFACTURE OF CONTINUOUS COUPLING ELEMENTS FOR SLIDE FASTENERS

[76] Inventor: Ikuo Takamatsu, No. 3671, Nomura, Daikaiji, Uozu, Toyama, Japan

[22] Filed: Dec. 27, 1974

[21] Appl. No.: 536,825

[30] Foreign Application Priority Data
Dec. 29, 1973 Japan.................. 49-2383

[52] U.S. Cl...................... 264/138; 29/207.5 R; 29/410; 24/205.13 C; 83/1; 83/303; 264/285; 264/288
[51] Int. Cl.²..................... B29C 17/02; B29D 7/24
[58] Field of Search.............. 29/410, 207.5 R, 408; 24/205.13 R, 205.13 C; 264/138, 145, 285, 288, 295; 83/917, 303, 1

[56] References Cited
UNITED STATES PATENTS

| | | | |
|---|---|---|---|
| 2,919,482 | 1/1960 | Casson | 29/410 X |
| 3,063,120 | 11/1962 | Steingrübner | 29/410 X |
| 3,086,246 | 4/1963 | Stone | 264/138 |
| 3,267,514 | 8/1966 | Porepp | 24/205.13 C |
| 3,336,640 | 8/1967 | Chery | 24/205.13 C |
| 3,503,289 | 3/1970 | Friberg | 83/1 |
| 3,548,694 | 12/1970 | Gelardi | 83/1 |

FOREIGN PATENTS OR APPLICATIONS

| | | | |
|---|---|---|---|
| 948,778 | 2/1964 | United Kingdom | 29/410 |

*Primary Examiner*—Victor A. DiPalma

[57] ABSTRACT

For the manufacture of a continuous coupling element of zigzag or meandering type, a blank strip of sheetlike material is first cut by rotary cutters into a continuous rodlike member of zigzag configuration. This zigzagging rodlike member is reshaped, as by a cooperative pair of forming dies, into meandering configuration in which the major transverse portions of the rodlike member are arranged parallel to each other with constant longitudinal spacings. Pressure is then applied centrally to each transverse portion of the meandering rodlike member to form a pair of lateral protuberances for use as a coupling head in the completed coupling element, and these transverse portions are bent by a combination guide channel-toothed wheel into the shape of a "U".

3 Claims, 5 Drawing Figures

U.S. Patent  Nov. 23, 1976  3,993,724
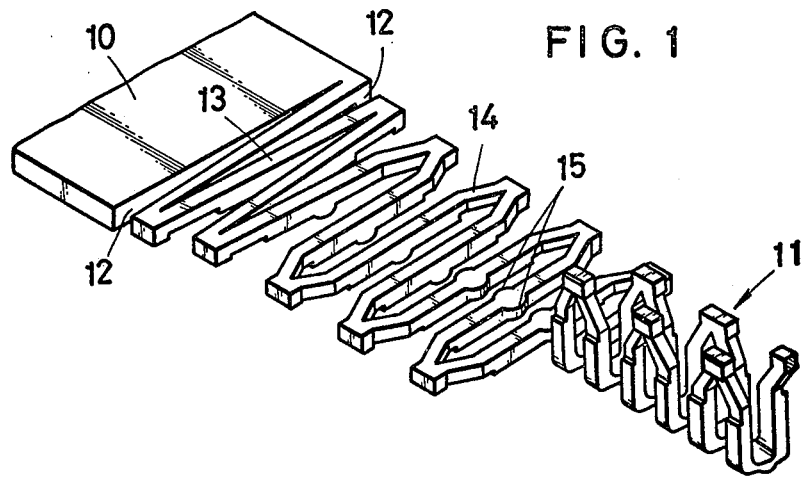
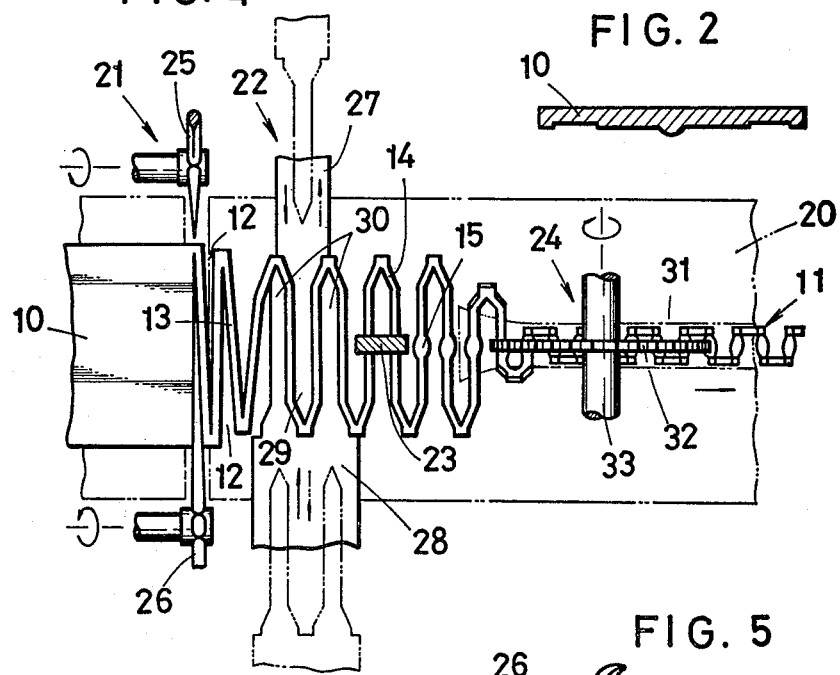
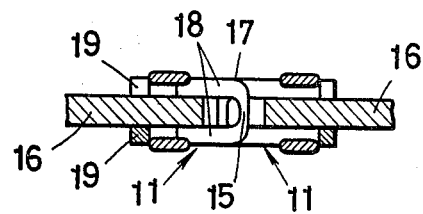
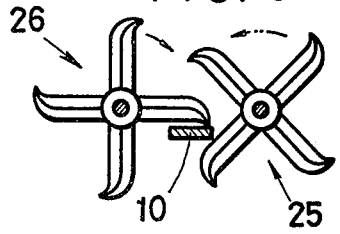

3,993,724

APPARATUS FOR THE MANUFACTURE OF CONTINUOUS COUPLING ELEMENTS FOR SLIDE FASTENERS

BACKGROUND OF THE INVENTION

This invention relates to the manufacture of continuous coupling elements for slide fasteners, and is more specifically directed to a method and apparatus for the manufacture of a continuous coupling element of the so-called zigzag or meandering type from a strip of sheetlike material. By the zigzag or meandering continuous coupling element is meant that type of coupling element having a series of U-shaped transverse portions each comprising a coupling head at one end and a pair of legs extending from the coupling head toward the other end, where the legs are connected by a series of longitudinal connective portions each of which interconnect two adjacent U-shaped portions and which are to be alternately arranged on the opposite sides of a stringer tape.

The production of a zigzag continuous coupling element from a strip of sheetlike material has been known, as disclosed for example in Japanese Patent Publication No. 37-9022. According to this patent, however, the desired coupling element is fashioned by removing unnecessary stock from the strip of sheetlike material by punching operation, so that substantial part of the strip is wasted.

SUMMARY OF THE INVENTION

It is accordingly an object of this invention to provide an improved method of manufacturing a continuous coupling element of zigzag or meandering type from a strip of sheetlike material, in such a manner that no part at all of the strip is wasted.

It is also an object of this invention to provide simple, practical and efficient apparatus for the manufacture of a continuous coupling element of zigzag or meandering type in accordance with the above mentioned method.

According to the method of this invention, briefly summarized, transverse cuts of predetermined length are alternately formed in a blank strip of sheetlike material from its opposite sides to provide a continuous rodlike member of zigzag configuration. The transverse portions of this zigzagging rodlike member are then rearranged or reshaped so as to be mostly in parallel spaced relationship to each other. A pair of lateral protuberances, necessary to provide the usual coupling head in the continuous coupling element of the above defined type, are then formed centrally on each transverse portion of the rodlike member by the application of pressure. These transverse portions are bent into the shape of a U to complete the continuous coupling element. Thus, inasmuch as the blank strip of sheetlike material is first cut into the rodlike member of zigzag configuration and is then reshaped into that of meandering configuration, the coupling element is manufacturable without any waste of the material.

Obviously, various means are employable for the manufacture of continous coupling elements by the above summarized method of the invention. Those specifically disclosed herein are believed to be most practical and appropriate for the purposes of this invention.

The above and other objects, features and advantages of the invention will become apparent in the course of the following description of the preferred method and apparatus embodiments which is to be read in connection with the accompanying drawings in which like reference characters refer to like parts throughout the several views.

BRIEF DESCRIPTION OF THE DRAWINGS

FIG. 1 is a perspective view explanatory of the sequential steps of manufacture of a continuous coupling element of zigzag or meandering type from a blank strip of sheetlike material according to the method of this invention;

FIG. 2 is a cross sectional view of the blank strip of sheetlike material shown in FIG. 1;

FIG. 3 is a cross sectional view of a pair of coupled slide fastener stringers in which there are employed the continuous coupling elements produced by the method or apparatus of the invention;

FIG. 4 is a schematic top plan view of a preferred form of the apparatus for the manufacture of the continuous coupling element according to the invention; and FIG. 5 is a front elevational view of a cutting mechanism constituting a part of the apparatus shown in FIG. 4.

DESCRIPTION OF THE PREFERRED METHOD EMBODIMENT

The method of this invention will now be described more specifically with particular reference to FIG. 1. There is first provided a blank strip of sheetlike material 10, such for example as that of thermoplastic synthetic resin, which has the cross sectional shape shown in FIG. 2. The width and the thickness of this blank strip 10 may be suitably determined in accordance with the pertinent dimensional specifications of a continuous coupling element 11, FIGS. 1 and 3, to be fashioned therefrom.

Transverse cuts 12 of predetermined length are alternately formed in the blank strip 10 from its opposite sides, so as to terminate short of the opposite edge of the strip, thereby providing a continuous rodlike member 13 of zigzag configuration. This rodlike member 13 of zigzag configuration succeedingly undergoes a slight modification in shape, as it is turned into one of meandering configuration, as indicated by the numeral 14 in FIG. 1, in which the major transverse portions of the rodlike member are arranged parallel to each other with prescribed constant longitudinal spacings.

Pressure is then applied centrally to each transverse portion of the meandering rodlike member 14 to provide a pair of lateral protuberances 15 that are necessary to form a coupling head in the completed continuous coupling element 11. The transverse portions of the meandering rodlike member 14 are succeedingly bent into the shape of a U to provide the continuous coupling element 11 which can be affixed in any convenient manner to the adjacent longitudinal edge portion of each stringer tape 16 as illustrated in FIG. 3.

It will be seen from a consideration of FIG. 3 in particular that the continuous coupling element 11 manufactured by the above described method of the invention is of the well known type including a series of U-shaped transverse portions 17 each comprising the coupling head with its lateral protuberances 15 and a pair of legs or shanks 18 extending rearwardly from the coupling head. The coupling heads are adapted for mating interengagement with the similar coupling heads of the complementary continuous coupling element. The rear ends of the legs 18 are connected by a series of connective portions 19 each of which interconnect two adjacent U-shaped transverse portions 17 and which are alternately located on the opposite sides of the stringer tape 16.

If, in the above described method of the invention, the strip of sheetlike material 10 is of thermoplastic synthetic resin, the reshaping of the zigzagging rodlike member 13 into the one 14 of meandering configuration and the succeeding operations on this rodlike member should preferably be conducted while the member is held at elevated temperatures. It is possible in this manner to produce continuous coupling elements of greater strength or stability.

While, in the illustrated embodiment of the invention, the successive transverse portions of the meandering rodlike member 13 are bent into U-shaped configuration after the pair of lateral protuberances 15 have been formed centrally on each transverse portion, it will be seen that this sequence of operations is not of absolute necessity. The two operations can be carried out simultaneously without departing from the scope of the invention.

DESCRIPTION OF THE PREFERRED APPARATUS EMBODIMENT

FIGS. 4 and 5 illustrate the various means which are believed to be best suited for the manufacture of the continuous coupling element 11 according to the method of this invention. The blank strip of sheetlike material 10 such as that of thermoplastic synthetic resin travels by indexed movement along a predetermined linear path over a frame or base structure 20. Arranged along the path of travel of the strip 10 are a cutting mechanism 21, a forming mechanism 22, a punch 23, and a bending mechanism 24.

The cutting mechanism 21 comprises a pair of rotary cutters 25 and 26 which are arranged on the opposite sides of the strip 10 traveling the predetermined path and which, as illustrated in detail in FIG. 5, each comprises a plurality of, four in the illustrated embodiment, blades projecting radially from a revolving shaft at constant angular spacings. The blades of the respective rotary cutters 25 and 26 rotate out of phase, in such a fashion that, as the blank strip of sheetlike material 10 is indexed along its predetermined path, the transverse cuts 12 of prescribed length are alternately formed in the strip from its opposite sides. The blank strip 10 is thus cut into the continuous rodlike member 13 of zigzag configuration.

The forming mechanism 22 comprises a pair of forming dies 27 and 28 arranged on the opposite sides of the zigzagging rodlike member 13 traveling the predetermined path. The die 27 includes a single prong 29, and the die 28 a pair of parallel spaced prongs 30, which are movable toward and away from each other as indicated by the arrows in FIG. 4. The prongs 29 and 30 are so shaped and sized that when the two dies are forced to their positions shown by the solid lines in the same drawing, the zigzagging rodlike member 13 is caught therebetween and is thereby reshaped into the member 14 of meandering configuration, with its major transverse portions arranged parallel to each other with prescribed longitudinal spacings.

The punch 23 is arranged next to the forming mechanism 22, over the path of travel of the strip 10 or of the meandering rodlike member 14. This punch reciprocates in a direction perpendicular to the plane of the meandering rodlike member 14 to exert pressure centrally on its successive transverse portions and hence to form the lateral protuberances 15.

The bending mechanism 24, arranged next to the punch 23, comprises a guide channel 31 of U-shaped cross section extending along and standing uprightly from under the path of travel of the meandering rodlike member 14, and a toothed wheel 32 fixedly mounted on a revolving shaft 23 over the guide channel 31 and projecting into the latter. Hence, as the toothed wheel 32 rotates in the arrow marked direction in step with the indexed movement of the meandering rodlike member 14 to force the latter into and through the guide channel 31, the rodlike member is bent into the shape of a U to provide the continuous coupling element 11 best illustrated in FIG. 1.

It will be apparent to those skilled in the art that the above described cutting mechanism 21, forming mechanism 22, punch 23 and bending mechanism 24 can be interlinked by well known means so that they may operate synchronously, in tune with the indexed movement of the strip 10 or the rodlike member 13 or 14 along its predetermined path of travel. If the strip 10 is made of thermoplastic synthetic resin, as previously mentioned, then the forming mechanism 22, the punch 23 and the bending mechanism 24 may be provided with suitable built-in heat generating means, in order that the continuous coupling element 11 produced may be of greater strength or stability.

While the method and apparatus for the manufacture of continuous coupling elements according to the invention have been disclosed in very specific aspects thereof, it is understood that all matter described herein or shown in the accompanying drawings is meant purely to illustrate or explain and not to impose limitations upon the invention. The invention, therefore, should and is intended to be construed broadly and in a manner comprehensive of various modifications falling within the scope of the following claims.

What is claimed is:

1. An apparatus for the manufacture of a continuous coupling element of the meandering type for a slide fastener, which apparatus comprises cutter means operable to form, in an indexedly moved, generally flat, strip of stock material, a series of transverse cuts of predetermined length less than the width of the strip, said cutter means forming said cuts alternately from opposite sides of the strip to convert said strip into a continuous, expanded ribbon of zigzag configuration, the central portion of said expanded ribbon being substantially in alignment with the central portion of said strip and corresponding to the coupling head portion of the finished coupling element; first forming means including a pair of forming dies positioned on respective opposite sides of said ribbon and operable to engage said ribbon to reshape the side portions thereof to form the leg portions of said coupling element; second forming means operable to engage the central portion of said ribbon and reshape same to form the coupling head portions of said coupling element; and bending means disposed for engagement with said ribbon to bend the side portions thereof about said central portion to form a coupling element of meandering type in which the respective leg and coupling head portions are in a U-shaped configuration.

2. The apparatus of claim 1 wherein said cutter means includes rotary cutters each having a plurality of blades arranged radially on a revolving shaft at constant angular spacings, said blades of each rotary cutter being positioned to rotate out of phase with those of the other rotary cutter.

3. The apparatus of claim 1, wherein said bending means comprises a guide channel of U-shaped cross section extending along and standing uprightly from under the path of travel of said expanded ribbon of zigzag configuration, and a toothed wheel fixedly mounted on a revolving shaft over said guide channel and projecting into the latter, said toothed wheel being adapted to cause said expanded ribbon of zigzag configuration to pass through said guide channel so that its transverse sections will be bent into the shape of a U.

* * * * *